United States Patent
Brown et al.

(10) Patent No.: US 10,152,692 B2
(45) Date of Patent: Dec. 11, 2018

(54) GOVERNING EXPOSING SERVICES IN A SERVICE MODEL

(75) Inventors: William A. Brown, Raleigh, NC (US);
Kerrie L. Holley, Montara, CA (US);
Garrison A. Moore, Uxbridge (CA);
William J. Tegan, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 12/327,029

(22) Filed: Dec. 3, 2008

(65) Prior Publication Data
US 2010/0138254 A1    Jun. 3, 2010

(51) Int. Cl.
*G06Q 10/10*    (2012.01)
*G06Q 10/06*    (2012.01)

(52) U.S. Cl.
CPC .......... *G06Q 10/10* (2013.01); *G06Q 10/063* (2013.01)

(58) Field of Classification Search
CPC ........ G06Q 10/00; G06Q 10/10; G06Q 10/06; G06Q 20/3674
See application file for complete search history.

(56) References Cited

U.S. PATENT DOCUMENTS

| | | |
|---|---|---|
| 5,745,878 A | 4/1998 | Hashimoto et al. |
| 6,363,393 B1 | 3/2002 | Ribitzky |
| 6,405,364 B1 | 6/2002 | Bowman-Amuah |
| 6,601,233 B1 | 7/2003 | Underwood |
| 6,640,249 B1 | 10/2003 | Bowman-Amuah |
| 6,665,861 B1 | 12/2003 | Francis et al. |
| 7,149,699 B2 | 12/2006 | Barnard et al. |
| 7,580,946 B2 | 8/2009 | Mansour et al. |

(Continued)

OTHER PUBLICATIONS

Bieberstein, Norbert et al., "Executing SOA: A Practical Guide for the Service-Oriented Architect", IBM Press, May 2008, pp. 179-203. Note, only relevant pp. 179-203 are included with this Office action.*

(Continued)

*Primary Examiner* — Maria C Santos-Diaz
(74) *Attorney, Agent, or Firm* — Joseph D. Downing; Jay A. Wahlquist; Kennedy Lenart Spraggins LLP

(57) ABSTRACT

Methods and systems for governing service identification in an SOA governance model according to embodiments of the present invention are provided. Embodiments include receiving a set of input parameters for identifying candidate services for the SOA; determining whether the set of input parameters comply with a predetermined input parameter validation policy. If the set of input parameters comply with a predetermined input parameter validation policy, governing service identification includes identifying in dependence upon the set of input parameters one or more candidate services available for the SOA in existing SOA business applications and determining whether each candidate services available in existing SOA business applications comply with a predetermined service selection policy. If one of the candidate services available in existing SOA business applications complies with a predetermined service selection policy, governing service identification includes selecting the candidate service as a service available for the SOA and communicating the identification of that selected service to relevant stakeholders in the SOA.

8 Claims, 8 Drawing Sheets

(56) References Cited

U.S. PATENT DOCUMENTS

| | | |
|---|---|---|
| 7,630,965 B1 | 12/2009 | Erickson et al. |
| 7,647,627 B2 | 1/2010 | Maida-Smith et al. |
| 7,685,604 B2 | 3/2010 | Baartman et al. |
| 7,720,198 B2 | 5/2010 | Schliermann |
| 7,725,469 B2 | 5/2010 | Colgrave et al. |
| 7,725,482 B2 | 5/2010 | Smith et al. |
| 7,730,123 B1 | 6/2010 | Erickson et al. |
| 7,739,228 B1 | 6/2010 | Erickson et al. |
| 7,761,844 B2 | 7/2010 | Bove et al. |
| 7,768,944 B2 | 8/2010 | Hao et al. |
| 7,937,673 B1 | 5/2011 | Kurshan et al. |
| 7,992,133 B1 | 8/2011 | Theroux et al. |
| 8,024,397 B1 | 9/2011 | Erickson et al. |
| 9,171,096 B2 | 10/2015 | Palanisamy |
| 2002/0120776 A1* | 8/2002 | Eggebraaten et al. ........ 709/246 |
| 2002/0194053 A1 | 12/2002 | Barrett et al. |
| 2004/0107124 A1 | 6/2004 | Sharpe et al. |
| 2004/0193703 A1 | 9/2004 | Loewy et al. |
| 2005/0108703 A1 | 5/2005 | Hellier |
| 2005/0154700 A1 | 7/2005 | Lele |
| 2005/0203784 A1 | 9/2005 | Rackham |
| 2005/0204048 A1 | 9/2005 | Pujol et al. |
| 2005/0222931 A1 | 10/2005 | Mamou et al. |
| 2005/0223109 A1 | 10/2005 | Mamou et al. |
| 2005/0232046 A1 | 10/2005 | Mamou et al. |
| 2006/0059253 A1 | 3/2006 | Goodman et al. |
| 2006/0080352 A1 | 4/2006 | Bourbez et al. |
| 2006/0112122 A1 | 5/2006 | Goldszmidt et al. |
| 2006/0155725 A1 | 7/2006 | Foster et al. |
| 2006/0235733 A1 | 10/2006 | Marks |
| 2006/0241931 A1 | 10/2006 | Abu el Ata et al. |
| 2006/0242195 A1 | 10/2006 | Bove et al. |
| 2006/0271660 A1 | 11/2006 | LaJeunesse |
| 2006/0277081 A1 | 12/2006 | Pham et al. |
| 2007/0043724 A1 | 2/2007 | Senan et al. |
| 2007/0069855 A1 | 3/2007 | Boland et al. |
| 2007/0074148 A1* | 3/2007 | Morgan ................. G06Q 10/06 717/101 |
| 2007/0143474 A1 | 6/2007 | Sheng et al. |
| 2007/0168753 A1 | 7/2007 | Herter et al. |
| 2007/0209059 A1 | 9/2007 | Moore et al. |
| 2007/0220479 A1 | 9/2007 | Hughes |
| 2007/0244904 A1 | 10/2007 | Durski |
| 2007/0265868 A1 | 11/2007 | Rapp et al. |
| 2007/0288275 A1 | 12/2007 | Kumar |
| 2008/0028329 A1 | 1/2008 | Erl |
| 2008/0028365 A1 | 1/2008 | Erl |
| 2008/0040292 A1 | 2/2008 | Nakayashiki |
| 2008/0046259 A1 | 2/2008 | Johnston |
| 2008/0052314 A1 | 2/2008 | Batabyal |
| 2008/0059378 A1 | 3/2008 | D'Alo et al. |
| 2008/0065466 A1 | 3/2008 | Liu et al. |
| 2008/0069082 A1 | 3/2008 | Patrick |
| 2008/0069124 A1 | 3/2008 | Patrick |
| 2008/0077652 A1 | 3/2008 | Grant et al. |
| 2008/0082569 A1 | 4/2008 | Mansour et al. |
| 2008/0126147 A1 | 5/2008 | Ang et al. |
| 2008/0127047 A1 | 5/2008 | Zhang et al. |
| 2008/0172269 A1 | 7/2008 | Senan et al. |
| 2008/0172621 A1 | 7/2008 | Soroker et al. |
| 2008/0270153 A1 | 10/2008 | Drapkin et al. |
| 2008/0282219 A1 | 11/2008 | Seetharaman et al. |
| 2008/0294408 A1 | 11/2008 | Padmanabhan |
| 2008/0300933 A1 | 12/2008 | Britton et al. |
| 2009/0043622 A1 | 2/2009 | Finlayson et al. |
| 2009/0063171 A1 | 3/2009 | Isom |
| 2009/0064087 A1 | 3/2009 | Isom |
| 2009/0100491 A1 | 4/2009 | Doyle et al. |
| 2009/0125796 A1 | 5/2009 | Day et al. |
| 2009/0158237 A1 | 6/2009 | Zhang et al. |
| 2009/0182565 A1 | 7/2009 | Erickson et al. |
| 2009/0187823 A1 | 7/2009 | Farrell et al. |
| 2009/0192867 A1 | 7/2009 | Farooq et al. |
| 2009/0193057 A1 | 7/2009 | Maes |
| 2009/0198534 A1 | 8/2009 | Brown et al. |
| 2009/0198535 A1 | 8/2009 | Brown et al. |
| 2009/0198537 A1 | 8/2009 | Brown et al. |
| 2009/0198550 A1 | 8/2009 | Brown et al. |
| 2010/0017252 A1 | 1/2010 | Chaar et al. |
| 2010/0049628 A1 | 2/2010 | Mannava et al. |
| 2010/0057522 A1 | 3/2010 | Borowski et al. |
| 2010/0071028 A1 | 3/2010 | Brown et al. |
| 2010/0095266 A1 | 4/2010 | Novak |
| 2010/0114586 A1* | 5/2010 | Barros .................. G06Q 10/06 705/1.1 |
| 2010/0125477 A1 | 5/2010 | Mousseau et al. |
| 2010/0131854 A1 | 5/2010 | Little |
| 2010/0138250 A1 | 6/2010 | Brown et al. |
| 2010/0138251 A1 | 6/2010 | Brown et al. |
| 2010/0138252 A1 | 6/2010 | Brown et al. |
| 2010/0138254 A1 | 6/2010 | Brown et al. |
| 2010/0146037 A1 | 6/2010 | Little |
| 2010/0198730 A1 | 8/2010 | Ahmed et al. |
| 2010/0217636 A1 | 8/2010 | Channabasavaiah et al. |
| 2010/0262558 A1 | 10/2010 | Edwards |
| 2010/0305994 A1 | 12/2010 | Gaskell |
| 2011/0093435 A1 | 4/2011 | Zha et al. |
| 2011/0264507 A1 | 10/2011 | Zhou et al. |
| 2012/0066145 A1 | 3/2012 | Adhikary |
| 2012/0066146 A1 | 3/2012 | Adhikary |
| 2012/0066147 A1 | 3/2012 | Adhikary |
| 2012/0066663 A1 | 3/2012 | Adhikary |
| 2012/0066671 A1 | 3/2012 | Adhikary |
| 2012/0310710 A1 | 12/2012 | Brown et al. |
| 2014/0257915 A1 | 9/2014 | Adhikary et al. |

OTHER PUBLICATIONS

"A Practical Service Oriented Architecture", MDH Project Architecture Team, Vers. 1.0, Oct. 2007.*

"Hashmi" (Hashi, Nada et al. "Abstracting Workflows: Unifying Bioinformatics Task Conceptualization and Specification Through Semantic Web Services", W3C Workshop on Semantic Web for Life Sciences, Oct. 27-28, 2004).*

White et. Al. "How Computers Work", Que, Oct. 2003, 7$^{th}$ Edition.

Office Action, U.S. Appl. No. 12/326,390, dated Jul. 19, 2011.

"SOA Governance: Framework and Best Practices", an Oracle White Paper, May 2007.

"SOA Practitioner's Guide: Part I Why Services-Oriented Architecture?", Sep. 15, 2006.

Executing SOA: A Practical Guide for the Service-Oriented Architect (Bieberstein et al, May 5, 2008).

Office Action, U.S. Appl. No. 12/024,772, dated Jan. 22, 2010.

Final Office Action, U.S. Appl. No. 12/024,772, dated Jun. 10, 2010.

Office Action, U.S. Appl. No. 12/233,156, dated Nov. 15, 2010.

Executiing SOA (Bieberstein et al., May 5, 2008, IBM).

Office Action, U.S. Appl. No. 12/025,328, dated Apr. 11, 2011.

Final Office Action, U.S. Appl. No. 12/233,156, dated Apr. 18, 2011.

Office Action, U.S. Appl. No. 12/024,746, dated Jun. 10, 2011.

Office Action, U.S. Appl. No. 12/025,340, dated Jun. 13, 2011.

Office Action, U.S. Appl. No. 12/326,354, dated Jun. 8, 2011.

Office Action, U.S. Appl. No. 12/327,029, dated Dec. 3, 2008.

Office Action, U.S. Appl. No. 12/326,412, dated Dec. 2, 2008.

Mohamad Afshar, SOA Governance: Framework and Best Practices, Version 1.1 (May 2007).

Bass, Clements, Kazman, "Software Architecture in Practice, Second Edition", (Apr. 9, 2003).

Notice of Allowance, U.S. Appl. No. 12/025,328, dated May 25, 2012.

Final Office Action, U.S. Appl. No. 12/327,029, dated Apr. 6, 2012.

Final Office Action, U.S. Appl. No. 12/326,412, dated Mar. 26, 2012.

Final Office Action, U.S. Appl. No. 12/326,390, dated Jan. 20, 2012.

Final Office Action, U.S. Appl. No. 12/326,354, dated Oct. 11, 2011.

Advisory Action, U.S. Appl. No. 12/327,029, dated Jun. 19, 2012.

Office Action. U.S. Appl. No. 12/882,662, dated Nov. 26, 2012.

Office Action, U.S. Appl. No. 13/572,670, dated Nov. 26, 2012.

Final Office Action, U.S. Appl. No. 13/572,670, dated Apr. 11, 2013.

(56) References Cited

OTHER PUBLICATIONS

Nicola M. Josuttis. "SOA in Practice", O'Reilly, Aug. 2007, First Edition.
Office Action, U.S. Appl. No. 12/882,571, dated Jan. 7, 2013.
Office Action, U.S. Appl. No. 12/882,607, dated Jan. 18, 2013.
Office Action, U.S. Appl. No. 12/882,745, dated Jan. 7, 2013.
Office Action, U.S. Appl. No. 12/882,774, dated Dec. 18, 2012.
Channabasavaiah et al., "Migrating to a Service-Oriented Architecture", On demand operating enviornment solutions White paper, Apr. 2004, pp. 1-22, IBM Corporation, Somers, NY.
Burns et al., "The Essentials of an SOA Coe", Oct. 2004, 16 pages, IBM Global Services, Somers, NY.
Holley et al., "IBM Assessments for Service Oriented Architecture", IBM Business Consulting Services, v5, 2004 (month unknown), 15 pages, IBM Corporation, Armonk, NY.
Holley et al., "IBM Assessments for Service Oriented Architecture", IBM Business Consulting Services, 2004 (month unknown), 17 pages, IBM Corporation, Armonk, NY.
IBM, "Establishing SOA CoE & Governance or Need to validate the asset name and the engagement model (scope) as defined asset", IBM Business Consulting Services, Apr. 2004, 41 pages, IBM Corporation, Armonk, NY.
IBM, "Assessment for AllAmerica Service Oriented Architecture", IBM Business Consulting Services, Jun. 2004, 10 pages, IBM Corporation, Armonk, NY.
IBM, "AVIS Futures SOA Assessment IBM Assessments for Service Oriented Architecture", IBM Business Consulting Services, Jun. 2004, 36 pages, IBM Corporation, Armonk, NY.
IBM, "IBM Strategy and Planning for Services Oriented Architecture", Jun. 2004, IBM Business Consulting Services, 37 pages, IBM Corporation, Armonk, NY.
IBM, "IBM Assessments for Service Oriented Architecture part 2—criteria and leading practices", IBM Business Consulting Services, 2004 (month unknown), 35 pages, IBM Corporation, Armonk, NY.
IBM, "Establish SOA Center of Excellence & SOA Governance", IBM Business Consulting Services, Jun. 2004, 30 pages, IBM Corporation, Armonk, NY.
Afshar, M., et al., "SOA Governance: Framework and Best Practices", An Oracle White Paper, May 2007, pp. 1-22, Version 1.1, Oracle Corporation, Redwood Shores, CA, USA.
Bass, Clements, Kazman, "Software Architecture in Practice, Second Edition", (Apr. 9, 2003), 1 page.
Bieberstein, N., et al., "Executing SOA: A Practical Guide for the Service-Oriented Architect", May 5, 2008, pp. 1-27, ibmpressbooks.com, IBM Press.
Brown, W., et al., "SOA governance: how to oversee successful implementation through proven best practices and methods", Effective governance through the IBM SOA Governance Management Method Approach White paper, pp. 1-48, Aug. 2006.
Burns, et al., "The Essentials of an SOA COE", Oct. 27, 2004, pp. 1-16, IBM Global Services.
Cherbakov, et al., "Impact of Service Orientation at the Business Level", IBM Systems Journal, Dec. 1, 2005, pp. 1-14, IBM SJ 44-4, IBM.
Durvasula, S., et al., "SOA Practitioners' Guide Part I Why Services-Oriented Architecture?", Sep. 15, 2006, pp. 1-18, URL: http://www.soablueprint.com/whitepapers/SOAPGPat1.pdf.
Erradi, A., et al., "SOAF: An Architectural Framework for Service Definition and Realization", IEEE International Conference on Services Computing (SCC'06), pp. 1-8, 2006 IEEE.
Ferguson, et al., "Service-Oriented Architecture: Programming Model and Product Architecture", IBM Systems Journal, Oct. 21, 2005, pp. 1-24, IBM SJ 44-4, IBM.
Freeland, J., "The New CRM Imperative," Ultimate CRM Handbook, McGraw-Hill, Chapter I, pp. 3-9, Sep. 24, 2002, Edition: 1.
Holley, K., "IBM Assessments for Service Oriented Architecture", 2004, pp. 1-15, IBM Corporation.
Inaganti, S., et al., "SOA Maturity Model", Apr. 2007, BPTrends, pp. 1-23, www.bptrends.com.
Proquest, "COBIT 4.0: Major Update to International Standard Helps Businesses Increase IT Value, Decrease Risk", PR Newswire Europe Including UK Disclose, Dec. 14, 2005, pp. 1-3, New York.
Veryard, R., "The Componenet-Based Business: Plug and Play", Springer-Verlog, London 2001, pp. 1-237, Practitioner series ISSN 1439-9245, ISBN 1-85233-361-8 Springer-Verlag London Berlin Heidelberg.
White, R., et. al. "How Computers Work", Que, Oct. 2003, pp. 1-65, 7th Edition.
IBM, Business Consulting Services, "Assessment for AllAmerica Services Oriented Architecture", Jun. 23-23, 2004, pp. 1-10, IBM Corporation.
IBM, Business Consulting Services, "AVIS Futures SOA Assessment IBM Assessment IBM Assessments for Service Oriented Architecture", Jun. 29, 2004, pp. 1-36, IBM Corporation.
IBM, Business Consulting Services, "Establish SOA Center of Excellence & SOA Governance", 2004, pp. 1-30, IBM Corporation.
IBM, Business Consulting Services, "IBM Assessments for Service Oriented Architecture", 2004, pp. 1-17, IBM Corporation.
IBM, Business Consulting Services, "IBM Assessments for Service Oriented Architecture part 2—criteria and leading practices", 2004, pp. 1-35, IBM Corporation.
IBM, Business Consulting Services, "Establishing SOA CoE & Governance or Need to validate the asset name and the engagement model (scope) as defined asset", 2004, pp. 1-41, IBM Corporation.
IBM, Business Consulting Services, "IBM Strategy and Planning for Services Oriented Architecture", 2004, pp. 1-37, IBM Corporation.
PR Newswire, "Mercury Unveils BTO Strategy for Service Oriented Architecture", Oct. 9, 2006, pp. 1-6, Ulitzer, Inc., URL: http://zapthink.ulitzer.com/node/281920.
PRNewswire, TIBCO Software: "TIBCO Empowers Customers With New Model for Accelerating Business Process Management Success", Apr. 10, 2007, pp. 1-2, PRNewswire, Accessed Aug. 6, 2012, URL: http://www.prnewswire.com/news-releases/tibco-empowers-customers-with-new-model-for-accelerating-business-process-management-success-57980817.html.
Businesswire, "Research and Markets: Cost Reduction is the Key Long-Term Driver of SOA Adoption", Feb. 15, 2007, pp. 1-3, Accessed: Aug. 6, 2012, URL: http://www.businesswire.com/portal/site/google/index.jsp?ndmViewId=news_view&newsId=20070215005402&newsLang=en.

* cited by examiner

GOVERNING EXPOSING SERVICES IN A SERVICE MODEL

BACKGROUND OF THE INVENTION

Field of the Invention

The field of the invention is data processing, or, more specifically, methods and systems for governing exposing services in a service model in a Service Oriented Architecture ('SOA').

Description of Related Art

Service Oriented Architecture ('SOA') is an architectural style that guides all aspects of creating and using business processes, packaged as services, throughout their lifecycle, as well as defining and provisioning the IT ('information technology') infrastructure that allows different applications to exchange data and participate in business processes loosely coupled from the operating systems and programming languages underlying those applications. SOA represents a model in which functionality is decomposed into distinct units (services), which can be distributed over a network and can be combined together and reused to create business applications. These services communicate with each other by passing data from one service to another, or by coordinating an activity between two or more services. The concepts of Service Oriented Architecture are often seen as built upon, and the evolution of, the older concepts of distributed computing and modular programming. Although services and a business's SOA architecture are often strictly defined, governance of an SOA, implementation of an SOA, operation of an SOA, and management of an SOA is often not defined. A defined model of governance, however, may increase effectiveness and efficiency in implementing, operating, and managing a business's SOA, thereby providing savings to the business.

SUMMARY OF THE INVENTION

Methods and systems for governing exposing services in a service model in a Service Oriented Architecture ('SOA'). Embodiments include receiving a list of candidate services available for exposure in an SOA; selecting a service; determining whether the service meets predetermined service architecture criteria; if the service meets predetermined service architecture criteria, including the service in the SOA and documenting the service in a service model for the SOA; if the service does not meet predetermined service architecture criteria, determining whether the service is exempt from the predetermined service architecture criteria; if the service is exempt from predetermined service architecture criteria, including the service in the SOA and documenting the service in a service model for the SOA.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Governing a Service Oriented Architecture ('SOA')

Figure 1:
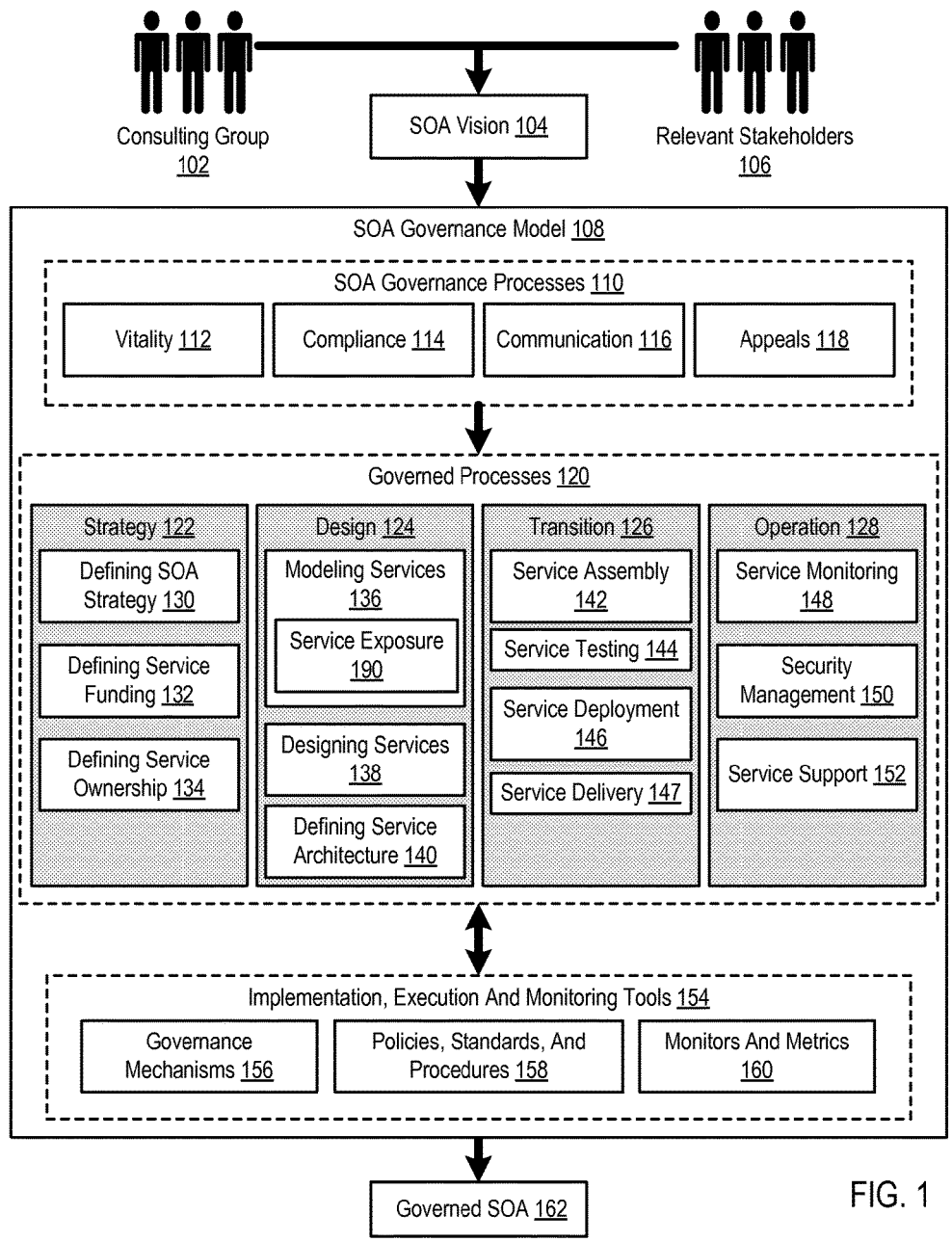
FIG. 1 sets forth a block diagram of a system for governing a Service Oriented Architecture ('SOA') according to embodiments of the present invention.

Exemplary methods and systems for governing an SOA in accordance with the present invention are described with reference to the accompanying drawings, beginning with FIG. 1. FIG. 1 sets forth a block diagram of a system for governing a Service Oriented Architecture ('SOA') according to embodiments of the present invention. SOA is an architectural style that guides all aspects of creating and using business processes, packaged as services, throughout their lifecycle, as well as defining and provisioning the information technology ('IT') infrastructure that allows different applications to exchange data and participate in business processes loosely coupled from the operating systems and programming languages underlying those applications. SOA represents a model in which functionality is decomposed into distinct units, called services, which can be distributed over a network, can be combined together, and reused to create business applications. These services communicate with each other by passing data from one service to another, or by coordinating an activity between two or more services. The concepts of Service Oriented Architecture are often seen as built upon, and the evolution of, the older concepts of distributed computing and modular programming.

The system of FIG. 1 includes an SOA governance model (108) that provides parameters used in governing a business's SOA, that is, a governed SOA (162). An SOA governance model may be established through use of a consulting group (102), using software tools and business artifacts, and relevant stakeholders (106) of a business. A consulting group may include one or more individuals that guide members of a business in establishing and implementing an SOA governance model. Such individuals typically are not members of the business. Consulting groups often work closely with relevant stakeholders of the business in establishing and implementing an SOA governance model.

A relevant stakeholder (106) of a business is an individual or party that affects, or can be affected by, a business's actions. "Relevant stakeholders," as the term is used in the specification, refers to stakeholders which are most directly affected by a business's actions with respect to SOA and often have decision making authority with regard to one or more aspects of the SOA governance model. Although only consulting groups and relevant stakeholders are described here with respect to implementing and operating a governance model in accordance with embodiments of the present invention, readers of skill in the art will immediately recognize that many other individuals or group of individuals associated with a business may take part in implementing and operating some or more aspects such a governance model and each such individual or group of individuals and their actions are also well within the scope of the present invention.

The exemplary SOA governance model (108) of FIG. 1 may be implemented and operated according to an SOA vision (104) that may be defined by the consulting (102) and the relevant stakeholders (106) of the business. That is, a consulting group may be used to guide relevant stakeholders through a process of identifying an SOA vision which may be used to define not only primary boundaries of the business's SOA, but also a governance model for the SOA. An SOA vision (104) is a general and broad definition of an SOA strategy to be accomplished through use of an SOA. An example of such an SOA strategy which may be accomplished through use of an SOA, is to reduce redundancy in the use of different software applications that provide similar functionality to different organizational entities of the business. Consider, for example, that a retail sales department and an online sales department use different software applications to provide the similar function of receiving and processing customer orders. An SOA vision may outline business goals of the SOA that may be implemented that reduce such redundancy by providing a single service of customer order receipt and processing to both the retail sales department and the online sales department of the business.

As mentioned above, an SOA governance model (108) provides parameters used in governing a business's governed SOA (162). The exemplary SOA governance model (108) of FIG. 1, for example, includes several SOA governance processes (110). An SOA governance process (110) is a processes that when executed governs one or more governed SOA processes (110), the governed processes typically used in implementing, operating, maintaining, and managing an SOA for a business. That is, the governance processes, when executed, effect governance of the typical implementation, operation, maintenance, and management of an SOA for a business.

The exemplary SOA governance model (108) of FIG. 1 the SOA includes a vitality (112) governance processes, a compliance (114) governance process, a communication (116) governance processes, and an appeals (118) governance process. The vitality (112) governance process maintains the applicability of the SOA governance model. The vitality process ensures that the governance model is current, reflecting current business and information technology and strategy, and also refines other governance processes and governance mechanisms to ensure continued usage and relevance of the governance model.

The compliance (114) governance process governs the review and approval processes used in implementing and managing services within an SOA. The governance processes includes providing criteria defined in the establishment of an SOA governance model to guide such review and approval processes. Such criteria may include a business's principles, standards, defined business roles, and responsibilities associated with those defined business roles.

The communication (116) governance process governs communication of SOA vision, SOA plans, and the SOA governance model to members of the business for educating such members. The communication governance process ensures that governance is acknowledged and understood throughout a business and also provides, to members of the business, environments and tools for easy access and use of information describing an SOA governance model.

The appeals (118) governance process enables members of a business to appeal SOA decisions. This appeals governance process therefore also provides exceptions to business policies, information technology policies, and other criteria that must typically be met within SOA decision-making processes.

As mentioned above, each of the governance processes when executed governs one or more governed processes. A governed process is a process used in implementing, operating, maintaining, and managing an SOA for a business. The exemplary SOA governance model (108) of FIG. 1 includes categories of governed processes (122, 124, 126, 128). Each category represents an area of SOA implementation, operation, maintenance, and management carried out by the governed processes included in the category.

The categories of governed processes in the example of FIG. 1 include strategy (122), design (124), transition (126), and operation (128). Processes included in the category of strategy (122) generally carry out an initial planning of service implementation. Examples of governed processes included in the category of strategy include a process for defining SOA strategy (130), defining service funding (132), and defining service ownership (134).

Processes included in the category of design (124) generally carry out identification and definition of particular services for an SOA. Examples of governed processes included in the category of design include a process for modeling services (136), designing services (138), and defining service architecture (140). In the example of FIG. 1 the governed process of modeling services (136) includes the process of service identification (190). Governing exposing services in a service model in a Service Oriented Architecture ('SOA') includes receiving a list of candidate services available for exposure in an SOA; selecting a service; determining whether the service meets predetermined service architecture criteria; if the service meets predetermined service architecture criteria, including the service in the SOA and documenting the service in a service model for the SOA; if the service does not meet predetermined service architecture criteria, determining whether the service is exempt from the predetermined service architecture criteria; if the service is exempt from predetermined service architecture criteria, including the service in the SOA and documenting the service in a service model for the SOA.

Processes included in the category of transition (126) generally carry out implementation of services in an SOA. Examples of governed processes included in the category of transition (126) include a process for service assembly (142), service testing (144), service deployment (146), and service delivery (147). Processes included in the category of operation (128) generally carry out management and monitoring of services operating within an SOA. Examples of governed processes included in the category of operation (128) include a process for service monitoring (148), security management (150), and service support (152).

The SOA governance processes (110) of FIG. 1 are executed and implemented by one or more implementation, execution and monitoring tools (154). Such implementation tools may include governance mechanisms (156). Governance mechanisms (156) may include one or more individuals, organizational entities, and business infrastructure to carry out governance according to the governance model (108). Such individuals may include relevant stakeholders, committees, or boards responsible for carrying out such governance. Organizational entities may include, for example, a board of directors, management groups, departments within a business, and the like. Business infrastructure may include available human labor, software applications, database management systems, computer technology, funding, and other types of business infrastructure as will occur to those of skill in the art. Different governance mechanisms (156) may be responsible for carrying out governance of different categories (122,124,126,128) of governed processes (120).

Other exemplary implementation and execution tools (154) in the exemplary system of FIG. 1 include policies, standards, and procedures (158). Policies, standards, and procedures (158) are embodiments of a business's overall business principles and are typically used in guiding decision-making in many of the governed processes (120). That is, policies, standards, and procedures (158) are compliance requirements, defined according to the business's SOA.

Other exemplary implementation, execution, and monitoring tools (154) in the exemplary system of FIG. 1 include monitors and metrics (160). Monitors are typically used to gather data describing performance of governed processes (120) and SOA governance processes (110). The data describing performance of governed processes and SOA governance processes may be compared to specified metrics in order to determine whether the performance of the governed processes and SOA governance processes is weak or strong. The metrics may also be used to identify particular steps of governed processes (120) and SOA governance processes (110) are ripe for improvement. As such monitors and metrics may be used to increase the efficiency and overall effectiveness of not only the governed processes typically used in implementing, operating, maintaining, and managing an SOA (162), but may also be used to increase the efficiency and overall effectiveness of the SOA governance processes (110) that govern such governed processes (120).

The arrangement of governance processes, governed processes, implementation and execution tools making up the exemplary system illustrated in FIG. 1 are for explanation, not for limitation. Systems useful according to various embodiments of the present invention may include additional computer technology, software applications, servers, routers, devices, architectures, organizational entities, and business members not shown in FIG. 1, as will occur to those of skill in the art. Networks in such systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms.

Figure 2:
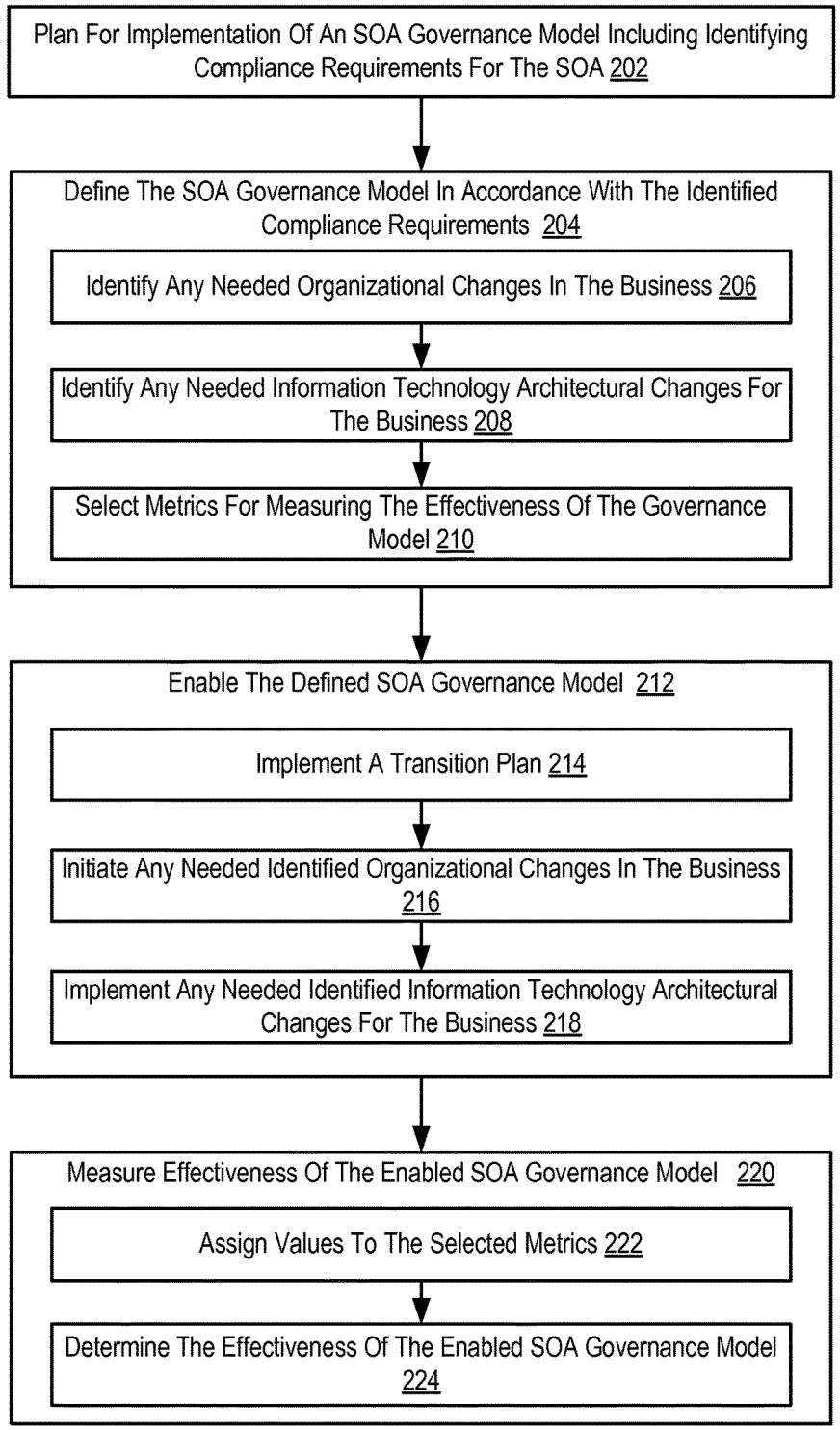
FIG. 2 sets forth a flow chart illustrating an exemplary method for governing an SOA according to embodiments of the present invention.

For further explanation, FIG. 2 sets forth a flow chart illustrating an exemplary method for governing an SOA according to embodiments of the present invention. The method of FIG. 2 includes planning (202) for implementation of an SOA governance model for governing a business's SOA. An SOA governance model provides parameters used in governing a business's SOA. In the method of FIG. 2, planning (202) for implementation of an SOA governance model for governing a business's SOA includes identifying compliance requirements for the SOA. Compliance requirements typically include criteria, principles, standards, business principles, and information technology principles of a business with which a businesses SOA, and therefore governance of the SOA, must typically comply. In some cases, however, exceptions to the compliance requirements may be made in accordance with governance processes defined within the SOA governance model. Planning (202) for implementation of an SOA governance model for governing a business's SOA may be carried out by one or more business members, one or more governance software applications, web servers, spreadsheets, databases, computers, networks, aggregations of software and hardware, and other tools and artifacts as will occur to those of skill in the art.

The method of FIG. 2 also includes defining (204) the SOA governance model in accordance with the identified compliance requirements. In the method of FIG. 2 defining (204) the SOA governance model in accordance with the identified compliance requirements includes identifying (206) any needed organizational changes in the business, identifying (208) any needed information technology architectural changes for the business, and selecting (210) metrics for measuring the effectiveness of the governance model. Organizational changes in the business may include restructuring of business departments, reorganization of a board of directors, hiring new employees, or removing current employees. Information Technology ('IT') architectural changes for a business may include modifying hardware infrastructure such as adding or removing a network or a data center. IT architectural changes may also include modifying software infrastructure for the business such as unifying the currently installed operating system on each of the business's computers, updating database management software, installing one or more software applications, and so on. Defining (204) the SOA governance model in accordance with the identified compliance requirements may be carried out by one or more business members, one or more governance software applications, web servers, spreadsheets, databases, computers, networks, aggregations of software and hardware, and other tools as will occur to those of skill in the art.

The method of FIG. 2 also includes enabling (212) the defined SOA governance model. In the method of FIG. 2, enabling (212) the defined SOA governance model includes implementing (214) a transition plan, initiating (216) any needed identified organizational changes in the business, and implementing (218) any needed identified information technology architectural changes for the business. A transition plan is a plan describing the execution of a modification in a business's SOA or in the business's SOA governance. Enabling (212) the defined SOA governance model may be carried out by one or more business members, one or more governance software applications, web servers, spreadsheets, databases, computers, networks, aggregations of software and hardware, and other tools as will occur to those of skill in the art.

The method of FIG. 2 also includes measuring (220) effectiveness of the enabled SOA governance model. In the example of FIG. 2 measuring (220) effectiveness of the enabled SOA governance model includes assigning (222) values to the selected metrics and determining (224), in dependence upon the values of the selected metrics, the effectiveness of the enabled SOA governance model. Measuring (220) effectiveness of the enabled SOA governance model may be carried out by one or more business members, one or more governance software applications, web servers, spreadsheets, databases, computers, networks, aggregations of software and hardware, and other tools as will occur to those of skill in the art.

Figure 3:
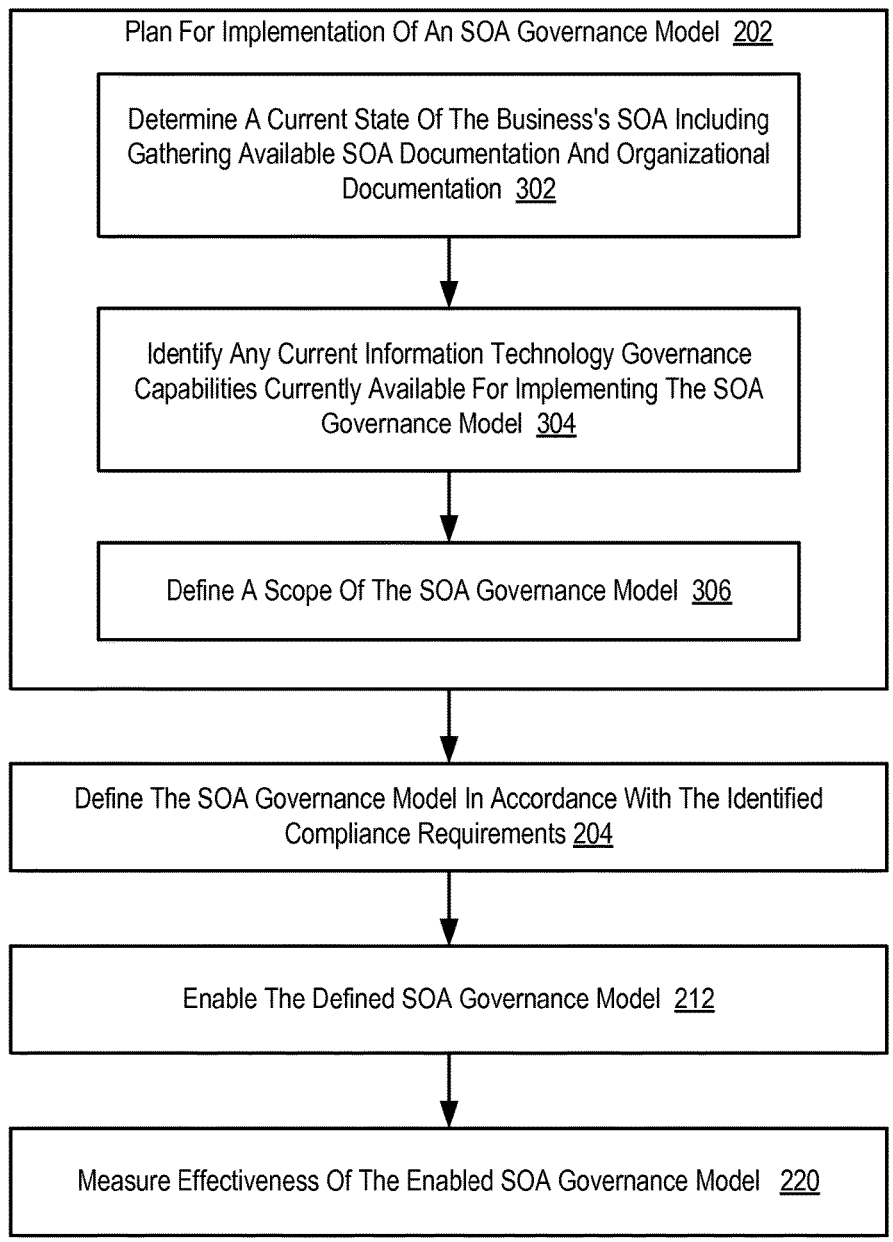
FIG. 3 sets forth a flow chart illustrating a further exemplary method for governing an SOA according to embodiments of the present invention.

For further explanation, FIG. 3 sets forth a flow chart illustrating a further exemplary method for governing an SOA according to embodiments of the present invention. The method of FIG. 3 is similar to the method of FIG. 2 in that the method of FIG. 3 also includes planning (202) for implementation of an SOA governance model for governing a business's SOA including identifying compliance requirements for the SOA, defining (204) the SOA governance model in accordance with the identified compliance requirements, enabling (212) the defined SOA governance model, and measuring (220) effectiveness of the enabled SOA governance model.

The method of FIG. 3 differs form the method of FIG. 2, however, in that in the method of FIG. 3, planning (202) for the implementation of an SOA governance model for governing business's SOA includes determining (302) a current state of the business's SOA including gathering available SOA documentation and organizational documentation, identifying (304) any current information technology governance capabilities currently available for implementing the SOA governance model, and defining (306) a scope of the SOA governance model.

In the method of FIG. 3, determining (302) a current state of the business's SOA including gathering available SOA documentation and organizational documentation may be carried out by identifying business principles of the business for use in the SOA governance model, identifying information technology principles of the business for use in the SOA governance model, and determining the effectiveness of current information technology governance procedures in governing current business principles and current information technology principles. A consulting group and relevant stakeholders may use software applications, artifacts, computer hardware, and other devices to carry out such identification and determination.

In the method of FIG. 3, identifying (304) any current information technology governance capabilities currently available for implementing the SOA governance model may be carried out by determining, in dependence upon a Control Objectives for Information and related Technology ('COBIT') framework, existing governance capabilities of the business; determining, in dependence upon a Service Integration Maturity Model ('SIMM'), existing governance capabilities of the business; and conducting a change readiness survey to identify existing information technology governance capabilities. COBIT is a set of "best practices" or a framework for information technology management created by the Information Systems Audit and Control Association ('ISACA'), and the IT Governance Institute ('ITGI'). COBIT provides managers, auditors, and IT user with a set of generally accepted measures, indicators, and processes to assist the managers, auditors, and IT users in maximizing the benefits derived through the use of information technology and developing appropriate IT governance and control. SIMM is a model used to increase maturity of service integration and SOA adoption through all areas of a business. A change readiness survey is a survey used to identify, evaluate, and monitor, the readiness of the business to accept and adopt changes required by SOA governance.

In the method of FIG. 3 defining (306) a scope of the SOA governance model may be carried out by identifying processes to be governed according to the business's SOA governance model, and identifying prospective governance mechanisms. Governance mechanisms are referred to here as "prospective" because the identified governance mechanisms may or may not be used when the governance model is implemented. Each prospective governance mechanism, however, is capable of administering SOA governance processes that govern the identified governed processes. As mentioned above, governance mechanisms may include one or more individuals, organizational entities, and business or technology infrastructure to carry out governance according to the governance model.

Figure 4:
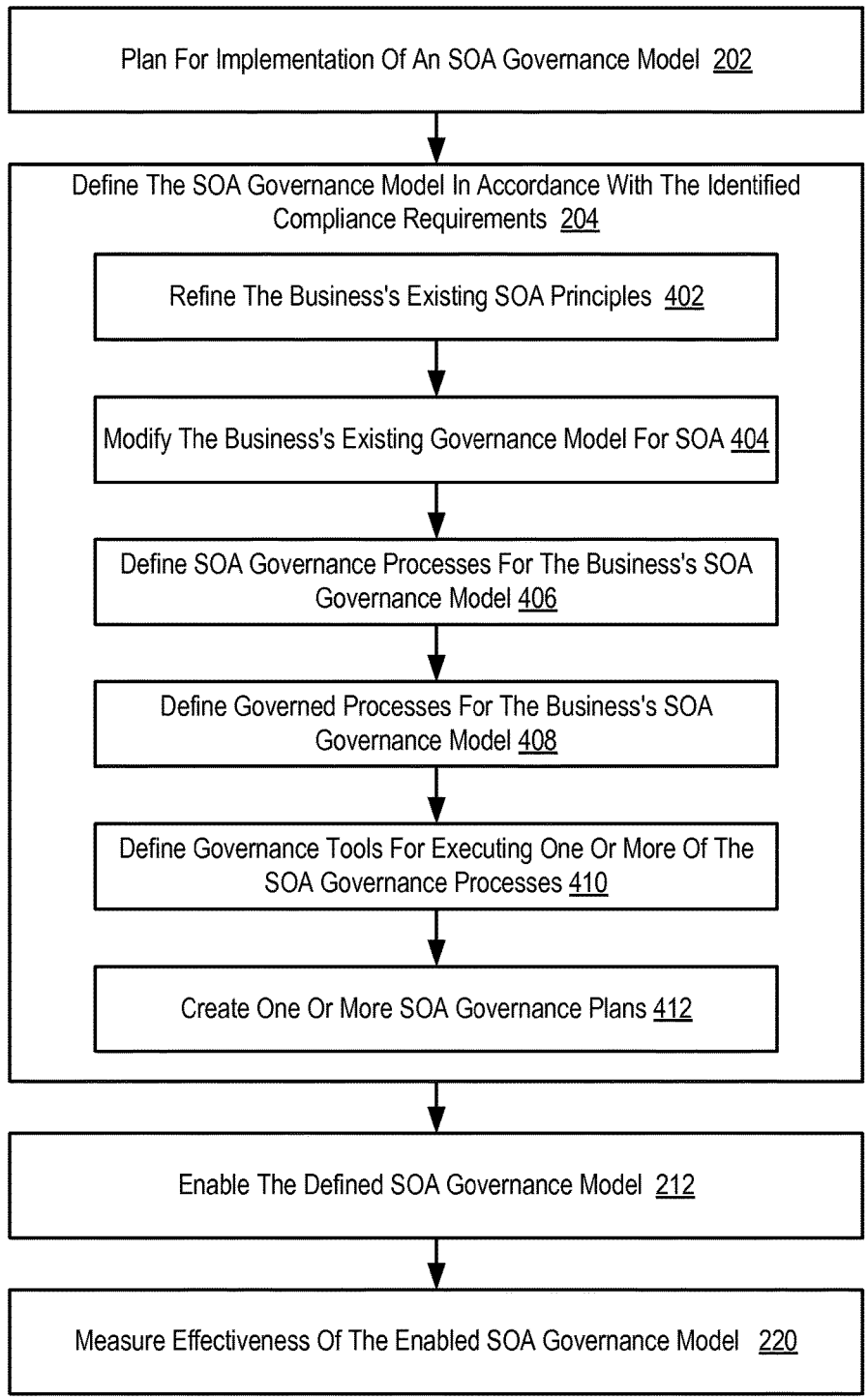
FIG. 4 sets forth a flow chart illustrating a further exemplary method for governing an SOA according to embodiments of the present invention.

For further explanation, FIG. 4 sets forth a flow chart illustrating a further exemplary method for governing an SOA according to embodiments of the present invention. The method of FIG. 4 is similar to the method of FIG. 2 in that the method of FIG. 4 also includes planning (202) for implementation of an SOA governance model for governing a business's SOA including identifying compliance requirements for the SOA, defining (204) the SOA governance model in accordance with the identified compliance requirements, enabling (212) the defined SOA governance model, and measuring (220) effectiveness of the enabled SOA governance model.

The method of FIG. 4 differs form the method of FIG. 2, however, in that in the method of FIG. 4 defining (204) the SOA governance model in accordance with the identified compliance requirements includes refining (402) the business's existing SOA principles; modifying (404) the business's existing governance model for SOA; defining (406) SOA governance processes for the business's SOA governance model, the SOA governance processes comprising processes that govern a set of governed processes in a business's SOA; defining (408) governed processes for the business's SOA governance model, each governed process capable of governing a portion of a business's SOA, each governed processes governed by one or more SOA governance processes; defining (410) governance tools for executing one or more of the SOA governance processes; and creating (412) one or more SOA governance plans.

In the method of FIG. 4, refining (402) the business's existing SOA principles may be carried out by updating the business's existing SOA business principles according to a business's SOA vision and updating the business's existing SOA information technology principles, policies, or standards according to the business's SOA vision. In some cases, a business may have existing SOA business principles prior to implementation of SOA governance. In other cases, the business's SOA is implemented in conjunction with the SOA governance model. For the former, existing SOA business principles may be modified according to the business's currently identified SOA vision which may vary when an SOA governance model is implemented. Also in some cases, a business may have existing SOA information technology principles, policies, and standards prior to the implementation of an SOA governance model. These existing SOA information technology principles, policies, and standards may also be modified in accordance with the business's currently identified SOA vision.

In the method of FIG. 4, modifying (404) the business's existing governance model for SOA may be carried out by redefining processes used in the business's existing governance model according to the business's SOA vision. In some cases a business may be operating within an existing governance model that governs aspects of the business other than SOA, such as for example, and existing IT governance model. Such an existing governance model may be modified for SOA by redefining the existing governance model according to the business's SOA vision and strategy.

In the method of FIG. 4, defining (408) governed processes for the business's SOA governance model may be carried out by selecting, from a preconfigured set of prospective governed processes in dependence upon a business's SOA vision, one or more prospective governed processes to be used as governed processes in the business's SOA governance model; developing, in dependence upon the business's SOA vision, one or more additional governed processes to be used as governed process in the business's SOA governance model; defining, for each selected and developed governed process, a policy for managing the governed process; and defining, for each governed process in dependence upon the governed processes defined policy, metrics for measuring the effectiveness of the governed process. In some cases a consulting group may provide a preconfigured set of prospective governed processes to relevant stakeholders to enable the relevant stakeholders to begin defining processes to be governed by an SOA governance model. In other cases, a consulting group and relevant stakeholders may create, define, and implement new processes to be governed by the business's SOA governance model. The policies defined for each of the governed processes typically identify parameters, based on the business principles, SOA principles, and IT principles, with which each governed process must comply.

In the method of FIG. 4, defining (410) governance tools for executing one or more of the SOA governance processes may be carried out by: identifying one or more of the business's current governance tools currently employed by the business; modifying one or more of the identified governance tools for use as governance tools for executing the business's SOA governance model; establishing one or more of the identified governance tools as governance tools for executing one or more SOA governance processes; establishing one or more additional governance tools for use as governance tools for executing one or more SOA governance processes, the additional governance tools not currently employed in the business's existing governance model; and defining metrics for measuring the effectiveness of each of the governance tools for executing one or more SOA governance processes. A governance tool includes any available business asset used in carrying out a governance process. Such available business assets may include one or more business members, organizational entities, computer technology, information technology infrastructure, artifacts, and other available assets as will occur to those of skill in the art.

In the method of FIG. 4, creating (412) one or more SOA governance plans may be carried out by creating an SOA governance support plan; creating an organizational change management plan including establishing one or more metrics for measuring effectiveness of an organization defined according to an organization change management plan; and creating an SOA transition plan. An SOA governance support plan may include a communication plan that defines methods of communicating SOA vision, standards, principles, and the like to members of a business. An SOA governance support plan may also include a mentoring plan that outlines methods for mentoring users of services in the SOA. An SOA governance support plan may also include an education and training plan that describes the training and education made available by a business for users and developers of service in the business's SOA.

Figure 5:
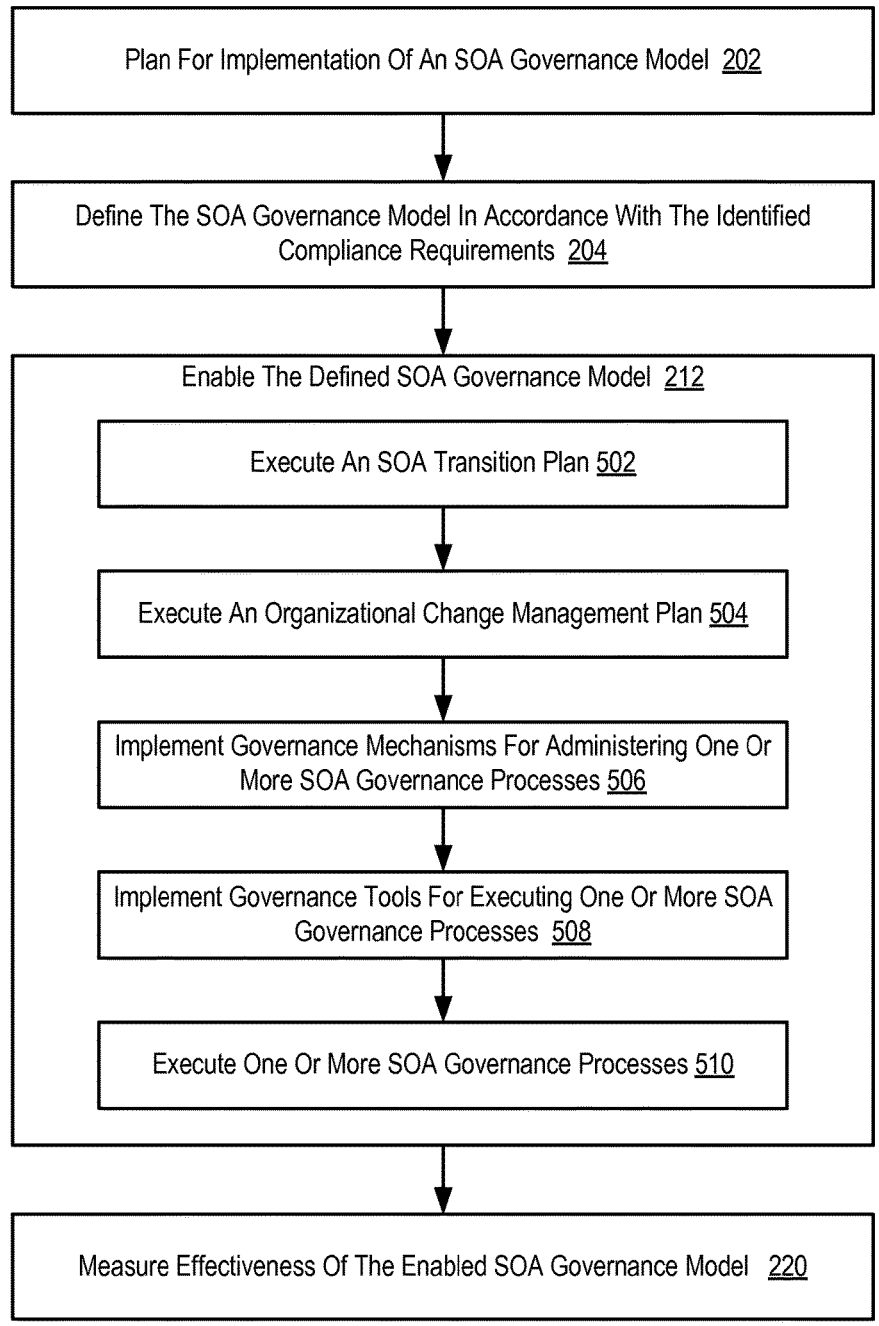
FIG. 5 sets forth a flow chart illustrating a further exemplary method for governing an SOA according to embodiments of the present invention.

For further explanation, FIG. 5 sets forth a flow chart illustrating a further exemplary method for governing an SOA according to embodiments of the present invention. The method of FIG. 5 is similar to the method of FIG. 2 in that the method of FIG. 5 also includes planning (202) for implementation of an SOA governance model for governing a business's SOA including identifying compliance requirements for the SOA, defining (204) the SOA governance model in accordance with the identified compliance requirements, enabling (212) the defined SOA governance model, and measuring (220) effectiveness of the enabled SOA governance model.

The method of FIG. 5 differs from the method of FIG. 2, however, in that in the method of FIG. 5, enabling (212) the defined SOA governance model includes executing (502) an SOA transition plan; executing (504) an organizational change management plan; implementing (506) governance mechanisms for administering one or more SOA governance processes that govern one or more governed processes implementing (508) governance tools for executing one or more SOA governance processes; and executing (510), by the governance mechanisms through use of governance tools, one or more SOA governance processes. As mentioned above, an SOA transition plan is a plan describing the execution of a modification in a business's SOA or in the business's SOA governance.

An organizational change management plan is a plan describing the steps of managing an organizational change in the business where such an organizational change aids in the governing of a business's SOA. Executing an organizational change management plan may be carried out by one or more members of the business having responsibility for carrying out such a change in organizational structure. Executing an organizational change management plan may include allocating resources, hiring new employees, restructuring existing business organizations, defining new responsibilities for current employees, and so on as will occur to readers of skill in the art.

Governance tools may include any available business asset used in carrying out a governance process. Governance tools such as IT tools, may be implemented by installing computer hardware such as blade servers, configuring computer hardware including configuring data communications networks, installing software, configuring database systems, installing plug-ins to existing software packages and so on as will occur to readers of skill in the art.

Figure 6:
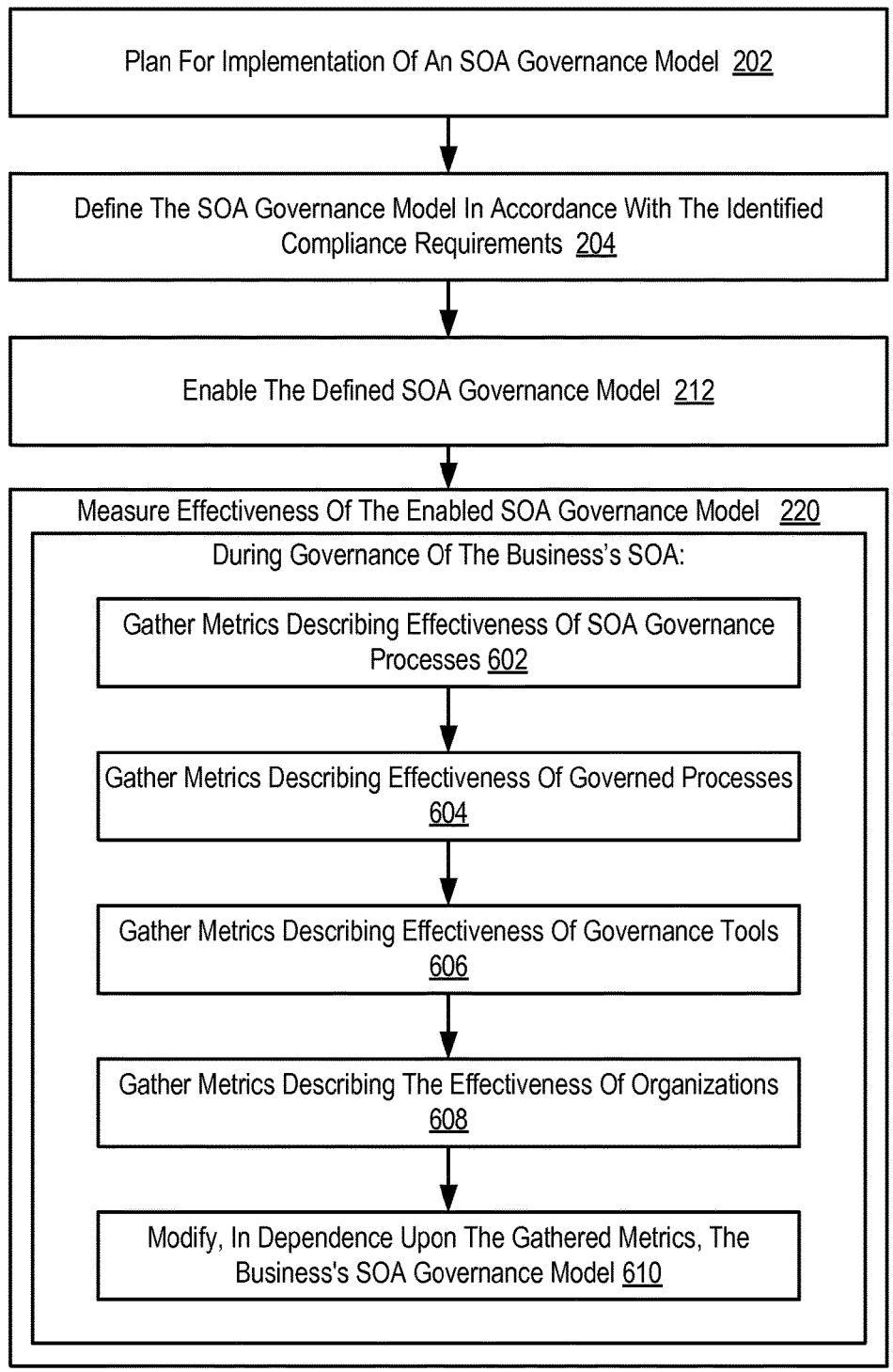
FIG. 6 sets forth a flow chart illustrating a further exemplary method for governing an SOA according to embodiments of the present invention.

For further explanation, FIG. 6 sets forth a flow chart illustrating a further exemplary method for governing an SOA according to embodiments of the present invention. The method of FIG. 6 is similar to the method of FIG. 2 in that the method of FIG. 6 also includes planning (202) for implementation of an SOA governance model for governing a business's SOA including identifying compliance requirements for the SOA, defining (204) the SOA governance model in accordance with the identified compliance requirements, enabling (212) the defined SOA governance model, and measuring (220) effectiveness of the enabled SOA governance model.

The method of FIG. 6 differs from the method of FIG. 2, however, in that in the method of FIG. 2, measuring (220) effectiveness of the enabled SOA governance model includes gathering (602) metrics describing effectiveness of SOA governance processes; gathering (604) metrics describing effectiveness of governed processes; gathering (606) metrics describing effectiveness of governance tools; gathering (608) metrics describing the effectiveness of organizations defined according to the business's organization change management plan; and modifying (610), in dependence upon the gathered metrics, the business's SOA governance model, all during governance of the business's SOA according to the enabled SOA governance model.

Metrics describing effectiveness may include surveys of business members involved in carrying out governance processes, data recorded by computer systems identifying decision making statistics, such as the amount of time required to make a decision, or the number of parties involved in the decision making process, and so on as will occur to those of skill in the art. Metrics typically describe a level of service. Metrics that measure a service level are compared to a baseline service level, a level of service which a business desires to provide through SOA and SOA governance. Metrics may therefore be used to identify areas of SOA or SOA governance which may be improved to more closely provide the baseline service level of business.

From time to time during governance of the business's SOA, the SOA governance model may be improved. Such improvement is enabled by gathering various metrics, assigning values to those gathered metrics, comparing the assigned values of the gathered metrics to criteria and identifying areas where improvement is needed. Once areas of needed improvement are identified, a consulting group and relevant stakeholders, such as for example, an SOA governance board, may improve the SOA governance model in the areas identified.

Governing Exposing Services in a Service Model

Figure 7:
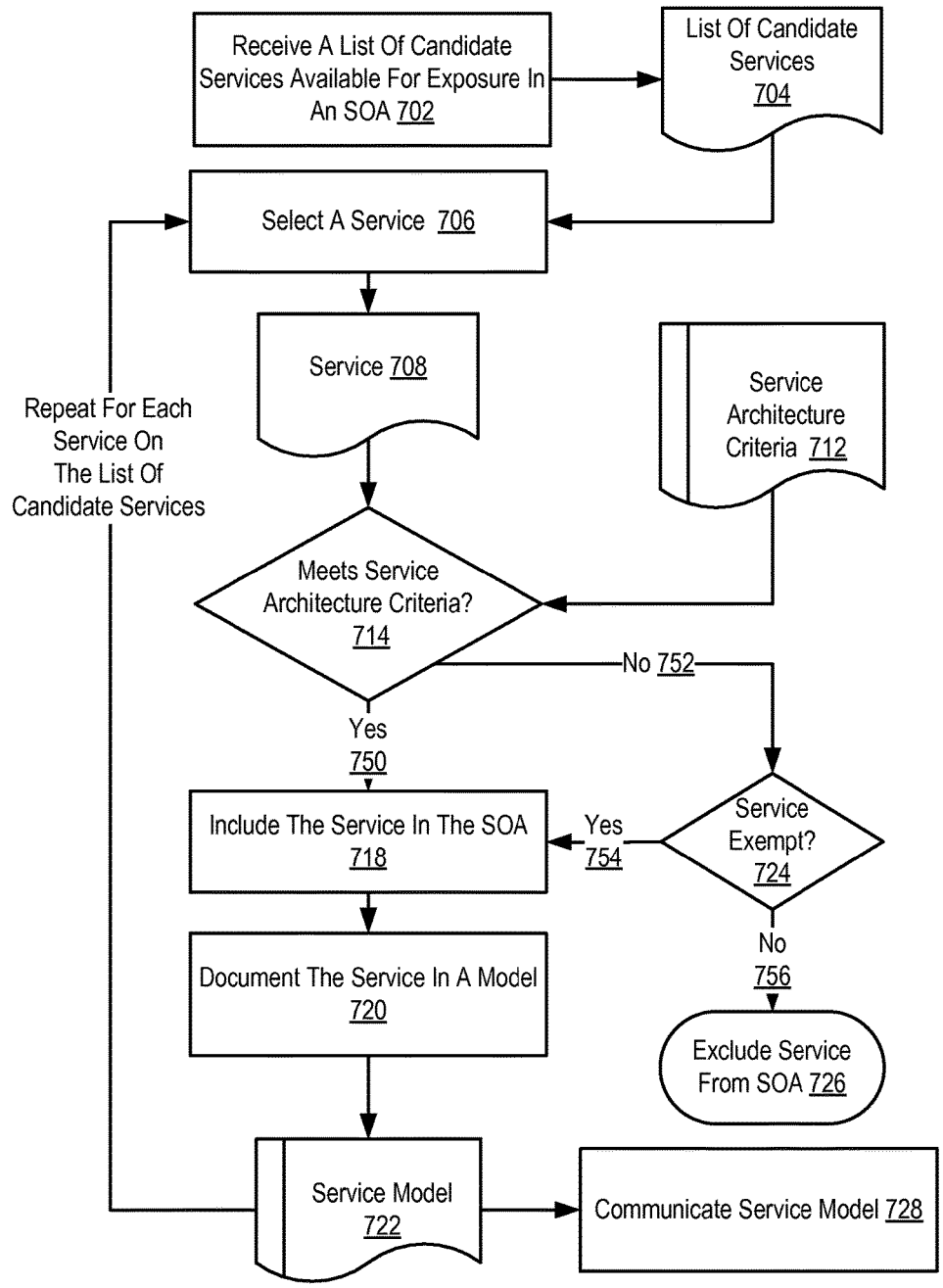
FIG. 7 sets forth a flow chart illustrating a method of governing exposing services in a service model in a Service Oriented Architecture ('SOA') according to the present invention.

FIG. 7 sets forth a flow chart illustrating a method of governing exposing services in a service model in a Service Oriented Architecture ('SOA') according to the present invention. A service model is implemented as the documentation of the collection services made available to the SOA that typically includes how each service is exposed to the SOA, the service's dependencies on other services, the composition of subcomponents of the service, and non-functional requirements of the service, the type of messaging used by the service, state management and lifecycle management of the service and other key aspects of the service. Exposing services consists of making those services available for use in an SOA. Services exposed in a service model are sufficiently documented in a service model such that those services may be usefully included in a global service architecture defining and documenting the complete SOA or a more complex portion of the SOA.

The method of FIG. 7 includes receiving (702) a list of candidate services (704) available for exposure in an SOA. Candidate services are often one or more existing services in existing SOA business application available for implementation in an SOA. Such candidate services are typically already identified as a service for use for the SOA according to predetermined service selection policies. Receiving (702) a list of candidate services (704) available for exposure in an SOA according to the method of FIG. 7 may be carried out by one or more business members, one or more business consultants, one or more governance software applications, web servers, spreadsheets, databases, computers, networks, aggregations of software and hardware, and other tools as will occur to those of skill in the art.

The method of FIG. 7 includes selecting (706) a service (708) and determining (714) whether the service meets predetermined service architecture criteria (712). Predetermined service architecture criteria (712) are predetermined selection requirements typically defining threshold requirements of a service for exposure to the service model of the SOA. Determining (714) whether the service meets predetermined service architecture criteria (712) may be carried out by determining whether aspects of the service comply with predetermined service specification requirements; determining whether available subsystem components upon which the service will be deployed comply with predetermined subsystem requirements, and determining whether required subcomponents of the service comply with service subcomponent requirements as described below with reference to FIG. 8. Selecting (706) a service (708) and determining (714) whether the service meets predetermined service architecture criteria (712) according to the method of FIG. 7 may be carried out by one or more business members, one or more business consultants, one or more governance software applications, web servers, spreadsheets, databases, computers, networks, aggregations of software and hardware, and other tools as will occur to those of skill in the art.

If the service meets (750) predetermined service architecture criteria (712), the method of FIG. 7 includes including (718) the service in the SOA and documenting (720) the service (708) in a service model (722) for the SOA. Documenting (720) the service (708) in a service model (722) for the SOA includes properly describing the service in the service model such that a service architect may implement the service in an SOA. Such documentation typically includes how each service is exposed to the SOA, the services dependencies on other services, the composition of subcomponents of the service, and non-functional requirements of the service, the type of messaging used by the service, state management and lifecycle management of the service and other key aspects of the service. Including (718) the service in the SOA and documenting (720) the service (708) in a service model (722) for the SOA according to the method of FIG. 7 may be carried out by one or more business members, one or more business consultants, one or more governance software applications, web servers, spreadsheets, databases, computers, networks, aggregations of software and hardware, and other tools as will occur to those of skill in the art.

If the service does not meet (752) predetermined service architecture criteria (712), the method of FIG. 7 also includes determining (724) whether the service (708) is exempt from the predetermined service architecture criteria (712). Determining (724) whether the service (708) is exempt from the predetermined service architecture criteria (712) is typically carried out by requesting opinions as to exemption from one or more business information sources, such as various relevant stakeholders, consultants in a consulting group, appropriate subject matter experts, or other business information sources and determining whether the service should be exempt from the thresholds established in the service architecture criteria in dependence upon those opinions. The determination of whether the service (708) is exempt from the predetermined service architecture criteria (712) is typically dependent upon factors such as the business functionality of the service, the business usefulness of the service and other factors that will occur to those of skill in the art. Determining (724) whether the service (708) is exempt from the predetermined service architecture criteria (712) according to the method of FIG. 7 may be carried out by one or more business members, one or more business consultants, one or more governance software applications, web servers, spreadsheets, databases, computers, networks, aggregations of software and hardware, and other tools as will occur to those of skill in the art.

If the service (708) is exempt (754) from predetermined service architecture criteria (712), the method of FIG. 7 includes including (718) the service in the SOA and documenting (720) the service (708) in a service model (722) for the SOA as described above. Exempt services may be specifically identified in the service model for later use by a service architect.

The method of FIG. 7 also includes communicating (728) the service model (722) to relevant stakeholders. Communicating (728) the service model (722) to relevant stakeholders in the SOA is typically carried out in accordance with a communication plan and the service model selected service is typically communicated to the appropriate stakeholders and often communicated by the process owner. Communicating (728) the service model (722) to relevant stakeholders in the SOA may be carried out by one or more business members, one or more business consultants, one or more governance software applications, web servers, spreadsheets, databases, computers, networks, aggregations of software and hardware, and other tools as will occur to those of skill in the art.

The method of FIG. 7 also includes excluding (726) the service (708) from the SOA if the service is not exempt (756) from predetermined service architecture criteria. Services that are not exempt are typically not included in the SOA and therefore they are typically not included in the service model and not communicated to architects implementing the SOA.

The method of FIG. 7 repeats for each service on the list (704) thereby governing the exposure of each service in the list of candidate services.

As mentioned above, governing exposing services in a service model in a Service Oriented Architecture ('SOA') according to the present invention includes determining whether the service meets predetermined service architecture criteria. For further explanation, FIG. 8 sets forth a flow chart illustrating a method of determining whether the service meets predetermined service architecture criteria. The method of FIG. 8 includes determining (802) whether aspects of the service (708) comply with predetermined service specification requirements (804). Service specification requirements are threshold requirements defined for exposing a service in a service model that describe the service generally or as a whole. That is, typical specification requirements are requirements that are service wide rather than directed toward the subsystem upon which the service is deployed or directed toward subcomponents of the service. Determining (802) whether aspects of the service (708) comply with predetermined service specification requirements (804) may be carried out by one or more business members, one or more business consultants, one or more governance software applications, web servers, spreadsheets, databases, computers, networks, aggregations of software and hardware, and other tools as will occur to those of skill in the art.

Figure 8:
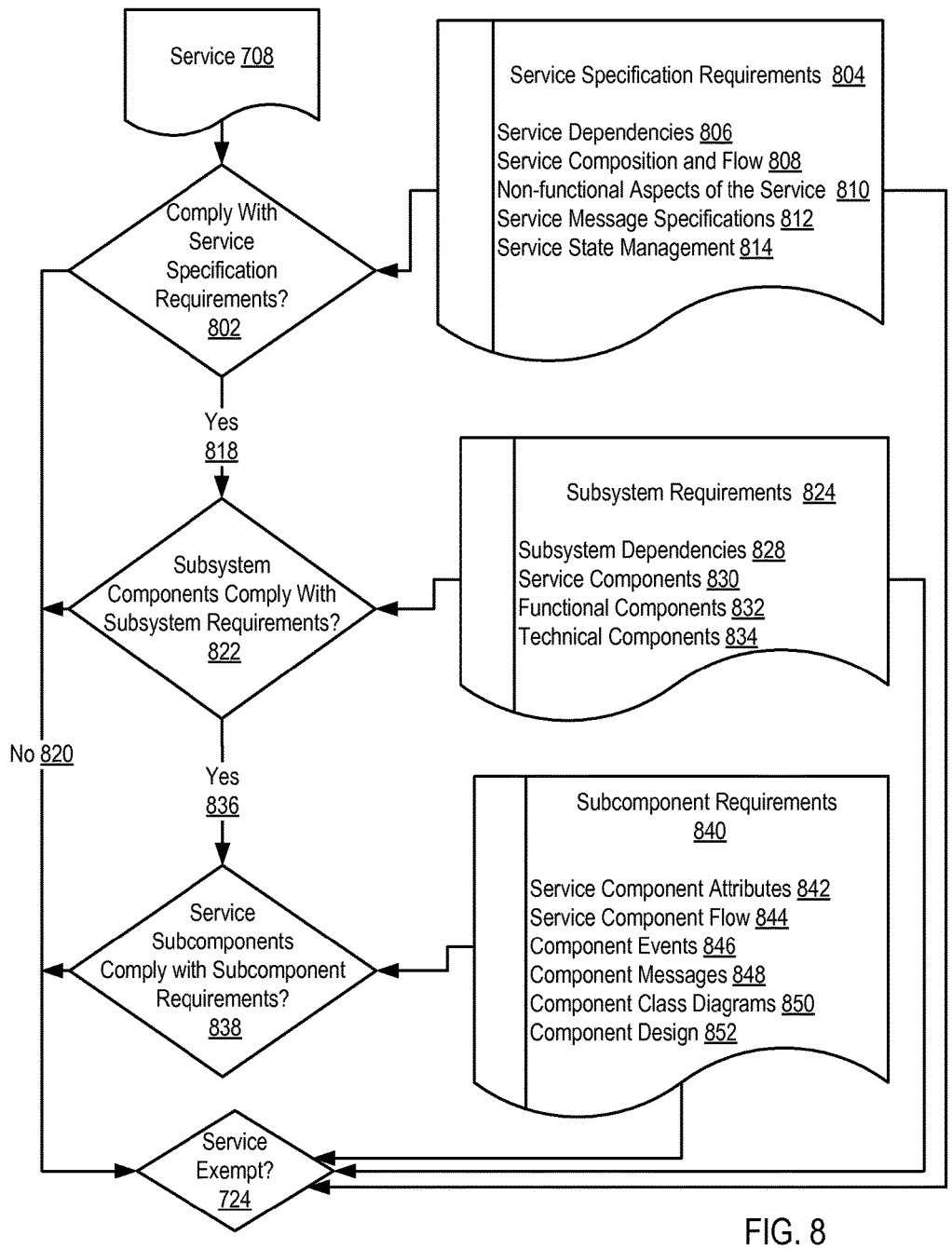
FIG. 8 sets forth a flow chart illustrating a method of determining whether the service meets predetermined service architecture criteria.

Determining (802) whether aspects of the service (708) comply with predetermined service specification requirements (804) according to the method of FIG. 8 is carried out by determining whether the service (708) complies with requirements for service dependencies (806), service composition and flow (808), non-functional aspects of the service (810), service message specifications (812), and the state of documents (814). Requirements for service dependencies (806) establish thresholds for the degree of dependency of the service in question upon the execution of another service. Service dependencies define the other services and components upon which aspects of the service in question depends. A review of the services will often expose a set of dependencies among services and between services and underlying service components. Although most dependencies might be on other services that will ultimately be exposed, some services may depend on functionality that ultimately will not be exposed and therefore may restrict the exposure of the service in question. Functional or composite dependencies include services that will depend on other services or components for their functionality. Pre-condition dependencies includes a dependency requiring that another service properly execute before the service in question can begin executing. Processing dependencies require another service to complete for the successful execution of the current service in question. A postcondition dependency requires another service to be invoked after the completion of execution of the current service.

Requirements for service composition and flow (808) include threshold requirements for the way that services interoperate. One of the layers of the SOA, the business process or choreography layer, is constructed by creating composite services. This is done through choreography or orchestration of services offered in the services layer.

Requirements for non-functional aspects of the service (810) include thresholds for aspects of service that are not directly related to the specific way in which the service operates. SOA provides the opportunity to choose a service provider based not only on the functionality that the service provides, but also on non-functional aspects of the service, such as, for example, on the quality of service (QoS) that the service provides. One of the reasons for exposing a service may often be a result of a change in non-functional requirements, such as requiring an increased level of QoS not currently supported by the existing SOA services. Additional non-functional aspects of the service include cost of the service, cost of a transaction of the service, performance metrics of the service, availability of the service, security needed to implement the service and many others as will occur to those of skill in the art.

Requirements for service message specifications (812) include requirements for messaging for the service such as message type and message protocol. Messages between communicating services are a critical part of a SOA. These include not only the input and output messages of a given service but also the internal message format to be used within the service as the flow of information passes through the layers of the application architecture. In many cases, a common message format is recommended.

Requirements for service state management (814) include thresholds defining the degree to which the service is responsible for management of its own state and the state of other services. Applications typically require the management of state. And service state management requirements define required responsibility for state management. Services may be left stateless. In such cases, a management module or another service is often responsible for the management of state of a stateless service. Alternatively, a component that implements and realizes multiple related services or operations on services may need to maintain state between invocations of different services for performance reasons.

The method of FIG. 8 includes determining (822) whether available subsystem components upon which the service will be deployed comply with predetermined subsystem requirements (824). Predetermined subsystem requirements (824) establish thresholds or requirements of the subsystem of hardware and software upon which the service is deployed. Determining (822) whether available subsystem components upon which the service will be deployed comply with predetermined subsystem requirements (824), may be carried out by one or more business members, one or more business consultants, one or more governance software applications, web servers, spreadsheets, databases, computers, networks, aggregations of software and hardware, and other tools as will occur to those of skill in the art.

Determining (822) whether available subsystem components upon which the service will be deployed comply with predetermined subsystem requirements (824) according to the exemplary method of FIG. 8 includes determining whether the subsystem components comply with requirements for subsystem dependencies (828), service components (830), functional components (832), and technical components (834).

Requirements for subsystem dependencies (828) includes thresholds for the dependencies and associations between subsystems upon which the service is deployed. A subsystem that relies on a service from another subsystem is said to be dependent on that subsystem. This includes dependencies on data that may be accessed via services that provide the required data.

Requirements for service components (830) include requirements for coarser-grained service components that together may realize a subsystem. In general, service components are larger-grained units that encapsulate a number of functional components and may depend on other service components for the fulfillment of their functionality. Service components, as a whole, provide the functionality corresponding to that required by a subsystem and may be a one-to-one correspondence. Often service components create an enterprise-scale asset. Infrastructure management often may ensure availability, load balancing, security, performance, versioning and overall health of the service component and therefore those factors are often requirements for determining whether available subsystem components upon which the service will be deployed comply with predetermined subsystem requirements.

Requirements for functional components (832) include thresholds for required collaboration of the functional components to provide functionality to support the service. The composition of functional components into a larger-grained service component is not merely structural; it also involves the definition of flow.

Requirements for technical components (834) include thresholds for technical subsystems. Examples of technical subsystems include authentication, logging and reporting used across business processes, and others as will occur to those of skill in the art.

The method of FIG. 8 also includes determining (838) whether required subcomponents of the service (708) comply with service subcomponent requirements (840). Service subcomponent requirements (840) define requirements of subcomponents of the individual service. Determining (838) whether required subcomponents of the service (708) comply with service subcomponent requirements (840) may be carried out by one or more business members, one or more business consultants, one or more governance software applications, web servers, spreadsheets, databases, computers, networks, aggregations of software and hardware, and other tools as will occur to those of skill in the art.

Determining (838) whether required subcomponents of the service (708) comply with service subcomponent requirements (840) according to the exemplary method of FIG. 8 includes determining whether the required subcomponents comply with requirements for service component attributes (842), service component flow (844), service events (846), service messages (848), service component class diagrams (850), and service design (852).

Requirements for service component attributes (842) include thresholds for required properties of the component. Examples of component attributes include variations of the component, whether the component depends upon another component, functionality provided by the component, functionality required for the execution of the component and so on as will occur to those of skill in the art.

Requirements for service component flow (844) include requirements for the way components of the service interoperate with one another. Requirements for component events (846) include requirements defining the events that components of the service must sense and respond to and how the components are triggered. For services that are driven by changes to data, a data-centric view must be taken and business processes not within the scope of the service-based solution must be identified and assessed for generation of events and the supplying of data to the consumer services in the service-oriented solution.

Requirements for component messages (848) include requirements for messaging for the component of the service such as message type and message protocol. These include not only the input and output messages of a given component but may also include the internal message format to be used within the component.

Requirements for service component class diagrams (850) include requirements for the degree to which a class diagram showing the relationships between the functional and technical components of each service component is needed. Standard UML modeling or other modeling may be required. Requirements for component design (852) include requirements for particular design patterns of the components of the service.

As discussed above, governing the exposure of services according to the present invention includes determining (724) whether the service is exempt from the predetermined service architecture criteria. In the method of FIG. 8, determining (724) whether the service is exempt from the predetermined service architecture criteria includes determining whether the service is exempt from predetermined service specification requirements (804), predetermined subsystem requirements (824), or predetermined subcomponent requirements (840). Determining whether the service is exempt from predetermined service specification requirements (804), predetermined subsystem requirements (824), or predetermined subcomponent requirements (840) is typically carried out by requesting opinions as to exemption from one or more business information sources, such as various relevant stakeholders, consultants in a consulting group, appropriate subject matter experts, or other business information sources and determining whether the service should be exempt from the predetermined service specification requirements (804), predetermined subsystem requirements (824), or predetermined subcomponent requirements (840). Determining whether the service is exempt from predetermined service specification requirements (804), predetermined subsystem requirements (824), or predetermined subcomponent requirements (840) according to the method of FIG. 8 may be carried out by one or more business members, one or more business consultants, one or more governance software applications, web servers, spreadsheets, databases, computers, networks, aggregations of software and hardware, and other tools as will occur to those of skill in the art.

A service from governing a Service Oriented Architecture ('SOA') according to the present invention is also provided. The service includes providing a predetermined service architecture criteria and exposing services in a service model in dependence upon the predetermined service architecture criteria. Exposing services in a service model in dependence upon the predetermined service architecture criteria includes receiving a list of candidate services available for exposure in an SOA; selecting a service; determining whether the service meets the predetermined service architecture criteria; if the service meets predetermined service architecture criteria, including the service in the SOA and documenting the service in a service model for the SOA; if the service does not meet predetermined service architecture criteria, determining whether the service is exempt from the predetermined service architecture criteria; if the service is exempt from predetermined service architecture criteria, including the service in the SOA and documenting the service in a service model for the SOA.

Exemplary embodiments of the present invention described largely in the context of methods for governing exposing services in a service model in a Service Oriented Architecture ('SOA') may also be implemented as services. Such services may be carried out in conducting business by a service provider for one or more clients as will occur to those of skill in the art.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of governing exposing services in a service model in a Service Oriented Architecture ('SOA'), the method comprising:
    receiving, by one or more modules of automated computing machinery, a list of candidate services available for exposure in an SOA;
    selecting, by one or more modules of automated computing machinery, a service;
    determining, by one or more modules of automated computing machinery, whether the service meets predetermined service architecture criteria, including:
        determining whether aspects of the service comply with predetermined service specification requirements;
        determining whether available subsystem components upon which the service will be deployed comply with predetermined subsystem requirements, wherein the predetermined subsystem requirements establish requirements of the subsystem of computing hardware and software upon which the service is deployed, wherein the service does not meet predetermined service architecture criteria if the subsystem components upon which the service will be deployed do not comply with the predetermined subsystem requirements;
        determining whether required subcomponents of the service comply with service subcomponent requirements; and
        determining whether the service complies with requirements for pre-condition service dependencies identifying another service that must properly execute before the service can begin executing;
        determining whether the service complies with requirements for postcondition service dependencies identifying another service that must be invoked after the completion of the service;
    if the service meets predetermined service architecture criteria, exposing the service including, by one or more modules of automated computing machinery, the service in the SOA and documenting the service in a service model for the SOA;
    if the service does not meet predetermined service architecture criteria, determining, by a business member or business consult, whether the service is exempt from the predetermined service architecture criteria, including determining whether the service is exempt from predetermined service specification requirements, predetermined subsystem requirements, or predetermined subcomponent requirements;
    if the service is exempt from predetermined service architecture criteria, including, by one or more modules of automated computing machinery, the service in the SOA and documenting the service in a service model for the SOA;
    excluding the service from the SOA if the service is not exempt from predetermined service architecture criteria; and
    in response to including one or more services in the SOA, communicating, via a computer network, the service model to relevant stakeholders.

2. The method of claim 1 wherein determining whether aspects of the service comply with predetermined service specification requirements further comprises determining whether the service complies with requirements for service dependencies, service composition and flow, non-functional aspects of the service, service message specifications, and the state of documents.

3. The method of claim 1 wherein determining whether available subsystem components upon which the service will be deployed comply with predetermined subsystem requirements further comprises determining whether the subsystem components comply with requirements for subsystem dependencies, service components, functional components, and technical components.

4. The method of claim 1 wherein determining whether required subcomponents of the service comply with service subcomponent requirements further comprises determining whether the required subcomponents comply with requirements for service component attributes, service component flow, service events, service messages, service component class diagrams, and service design.

5. A system of governing exposing services in a service model in a Service Oriented Architecture (SOX), the system comprising a computer processor, a computer memory operatively coupled to the computer processor, the computer memory having disposed within it computer program instructions that, when executed by the computer processor, cause the system to carry out the steps of:
    receiving a list of candidate services available for exposure in an SOA;
    selecting a service;
    determining whether the service meets predetermined service architecture criteria including:
        determining whether aspects of the service comply with predetermined service specification requirements;
        determining whether available subsystem components upon which the service will be deployed comply with predetermined subsystem requirements, wherein the predetermined subsystem requirements establish requirements of the subsystem of computing hardware and software upon which the service is deployed, wherein the service does not meet predetermined service architecture criteria if the subsystem components upon which the service will be deployed do not comply with the predetermined subsystem requirements;
        determining whether required subcomponents of the service comply with service subcomponent requirements; and
        determining whether the service complies with requirements for pre-condition service dependencies identifying another service that must properly execute before the service can begin executing;

determining whether the service complies with requirements for postcondition service dependencies identifying another service that must be invoked after the completion of the service;

if the service meets predetermined service architecture criteria, exposing the service including the service in the SOA and documenting the service in a service model for the SOA if the service meets predetermined service architecture criteria;

in response to a determination, by a business member or business consultant, that the service does not meet predetermined service architecture criteria and is exempt from the predetermined service architecture criteria including predetermined service specification requirements, predetermined subsystem requirements, or predetermined subcomponent requirements including the service in the SOA and documenting the service in a service model for the SOA;

excluding the service from the SOA if the service is not exempt from predetermined service architecture criteria; and in response to including one or more services in the SOA, communicating, via a computer network, the service model to relevant stakeholders.

6. The system of claim 5 wherein determining whether aspects of the service comply with predetermined service specification requirements further comprises determining whether the service complies with requirements for service dependencies, service composition and flow, non-functional aspects of the service, service message specifications, and the state of documents.

7. The system of claim 5 wherein determining whether available subsystem components upon which the service will be deployed comply with predetermined subsystem requirements further comprises determining whether the subsystem components comply with requirements for subsystem dependencies, service components, functional components, and technical components.

8. The system of claim 5 wherein determining whether required subcomponents of the service comply with service subcomponent requirements further comprises determining whether the required subcomponents comply with requirements for service component attributes, service component flow, service events, service messages, service component class diagrams, and service design.

\* \* \* \* \*